March 18, 1930.
J. F. WENTZ
1,751,259
TREATING LOADED SUBMARINE CABLES
Filed Sept. 24, 1927
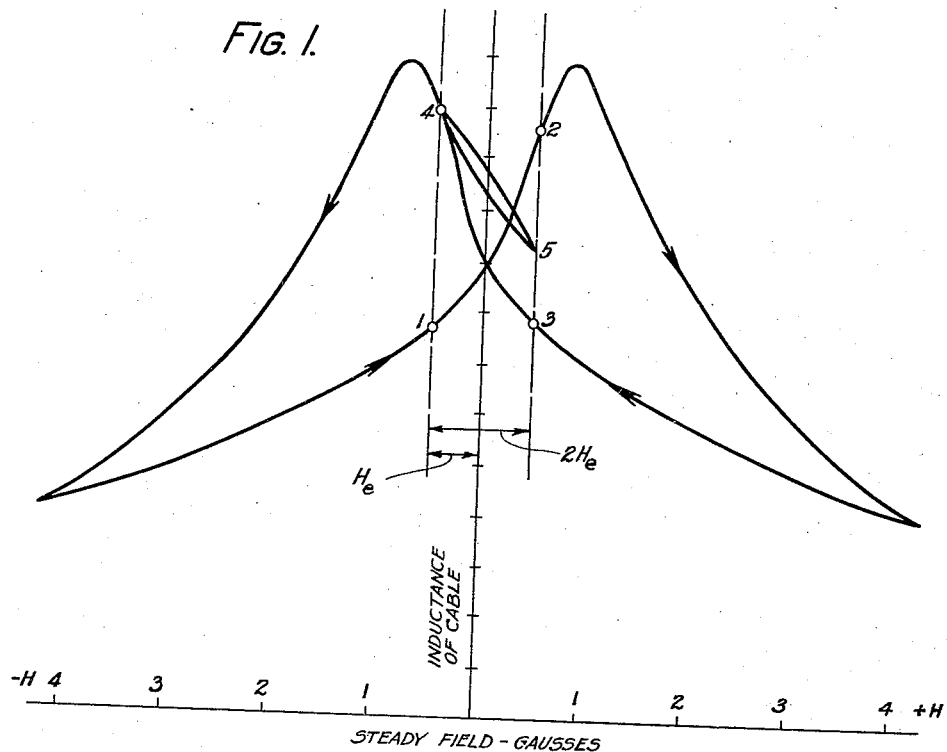
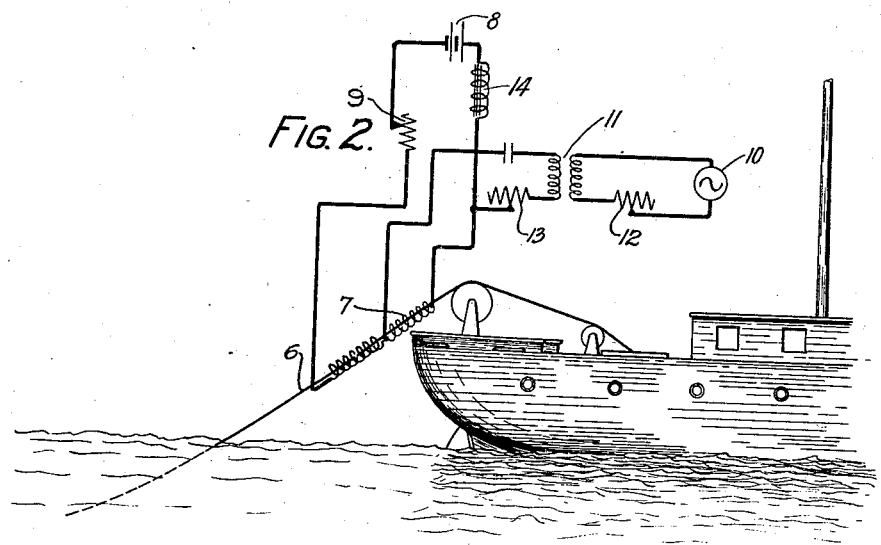
INVENTOR
JESSE F. WENTZ
BY J. W. Schmied
ATTORNEY Patented Mar. 18, 1930

1,751,259

UNITED STATES PATENT OFFICE

JESSE F. WENTZ, OF NEW YORK, N. Y., ASSIGNOR TO BELL TELEPHONE LABORATORIES, INCORPORATED, OF NEW YORK, N. Y., A CORPORATION OF NEW YORK

TREATING LOADED SUBMARINE CABLES

Application filed September 24, 1927. Serial No. 221,714.

The present invention relates to means for improving the electrical characteristics of loaded submarine conductors.

A detrimental peculiarity of continuously loaded submarine cables resides in the erratic variations of their constants, which variations are probably due to mechanical strains to which the loading material has been subjected during the manufacturing operations and the subsequent handling of the cable.

Another factor which detrimentally affects the properties of loaded submarine cables, particularly the inductance of such cables, has been found to reside in the effect which the earth's magnetic field exerts upon the loading material of the cables and which may cause considerable loss of inductance.

It has been proposed in the art to subject loaded submarine cables during or after their manufacture to the demagnetizing action of alternating currents for the purpose of rendering the properties of these cables more uniform. See for instance British Patents 224,827 complete accepted Nov. 20, 1924, and 235,570 complete accepted Oct. 22, 1925. However, the objects of the present invention are not attained by magnetizing or demagnetizing a cable by means of an alternating current alone. Among the reasons why such a method would not entirely suffice, we may mention that during the laying operation of the cable, even after it leaves the ship, it is subject to violent vibrations and strains which may in conjunction with the prevailing earth's field cause considerable loss of the inductance of the cable.

Among the objects of the present invention are to secure high inductance in loaded submarine signaling cables, to retain the inductance of such cables at the original high values imparted to them during their manufacture and heat treatment, and to counteract the detrimental effects which the magnetic earth's field tends to exert upon the loading material of loaded submarine cables.

In an application for U. S. Letters Patent filed by J. J. Gilbert, Serial No. 218,841, filed Sept. 10, 1927, there is described and claimed among other things a method for reducing the effective resistance and inductance of terminal sections of loaded submarine cables. Inasmuch as it is beneficial to have higher inductance at the central portions of submarine cables, the method disclosed in the present application may be used advantageously in conjunction with that above referred to, the former for reducing the inductance at terminal sections, and the latter for increasing the inductance of the central sections.

These as well as other objects and advantages are obtained in one aspect of the invention by the application of a direct current field to the cable in a direction opposite to that which will be produced in the loading material by the earth's field, after the laying of the cable, and by simultaneously passing an alternating current through the cable sufficient in intensity to saturate the loading material, then gradually reducing the alternating current to zero.

The principles underlying the present invention have been found by experiments. It has been discovered that when an alternating current sufficient in intensity to saturate the loading material of a submarine cable was passed through the conductor under the influence of a given earth's field and gradually reduced to zero, the inductance of the cable dropped about 15% from the original value. To this phenomenon and to the effect produced by it we shall refer hereinafter as "stabilizing." It has also been found that similar effects have been produced by handling the finished loaded conductor. It has also been observed that when a piece of loaded conductor was placed in a direction parallel to the magnetic meridian, stabilized, and then turned through 180° its inductance increased 15% above the original value.

In the accompanying drawings Fig. 1 shows the effect of a unidirectional field on the inductance of a loaded submarine cable. The cable was stabilized electrically in the earth's field in the manner described above and its inductance measured by passing a small alternating current through it. This condition of the conductor, when the field is equal to the full earth field, is graphically represented on the figure by point 1, $H_e$ indicating the intensity of the earth's field at the place of measurement. When a unidirectional magnetizing force twice the strength of that of the full earth's field, and in direction opposing it, was applied by a solenoid, the inductance of the cable increased rapidly as represented by the curve between the points 1 and 2. When a superimposed alternating current sufficient to saturate the loading material was passed through the cable and gradually reduced to zero, the inductance dropped to point 3, and when finally the auxiliary direct current field was removed, the inductance rose from point 3 to point 4.

The manner in which the present invention applies the phenomena described, in order to avoid loss of inductance of a cable being laid, will now be explained in connection with Fig. 2, which illustrates one mode of practicing this invention. The cable 6 passes through a winding 7 connected to a source of direct current 8 which is in series with an adjustable resistance 9. Winding 7 is also connected to a source of alternating current 10 by means of transformer 11 and adjustable resistances 12 and 13. Iron core choke coil 14 tends to prevent the flow of alternating current in the direct current circuit. By means of the direct current source 8 a unidirectional field may be produced by the current through the winding 7 and adjusted by resistance 9 to any desired intensity. When the cable comes out of the ship's tank we may assume that it is in the magnetic state represented by point 1 in Fig. 1. In accordance with the invention, a direct current of such magnitude is now applied that the direct current field in the cable loading due to the current in coil 7 plus the earth's field prevailing at that point is equal to the estimated earth's field effective after laying on the ocean bottom and opposite in direction thereto.

As is shown in Fig. 1, the application of this unidirectional field increases the inductance of the cable from point 1 to point 2. The cable now being in the electric state represented by point 2, an alternating current field is superimposed on the cable by means of alternating current source 10. Preferably the alternating current should have a frequency of from 20 to 60 cycles per second. In exceptional cases a higher frequency may be used, but the frequency should ordinarily not exceed about 150 cycles per second on account of difficulties due to skin effects or "shielding," which would arise in the loading material. The test for determining the maximum intensity of the alternating field to be applied is that it should be of sufficient intensity to stabilize the loading material of the cable. Due to the action of this alternating current field superposed upon the unidirectional field the inductance of the cable drops from point 2 of Fig. 1 to point 3. As the laying operation proceeds the cable moves out of the coil and the effect of the alternating field becomes weaker until it is reduced to zero. At the same time the direct current field also diminishes to zero and under the influence of the earth's field the inductance of the cable rises from point 3 to point 4 of Fig. 1. Whether an increase of inductance is obtained, or a loss is prevented, will depend in each particular case upon the magnetic condition of the cable due to previous handling, to the effect of fields upon which it had been previously subjected, and to the relation of its magnetic condition to the intensity and direction of the earth's field in which it is to be laid.

What is claimed is:

1. The method of treating a loaded submarine signaling cable, which comprises applying a direct current field to the cable in a direction opposite to and commensurate in intensity to that expected to be produced in said cable by the earth's field when in use, and simultaneously applying an alternating field sufficient to saturate the loading of said cable, and gradually reducing to zero the alternating field acting upon successive portions of said cable.

2. The method of preventing loss of inductance while laying a loaded submarine signaling conductor, which comprises passing the conductor through a portion of space and creating in said space an alternating current field sufficient to saturate the loading material of said conductor and a direct current field of such value that together with the value of the earth's field in loco the field produced is substantially equal and opposite in direction to the earth's field acting upon the laid conductor.

3. The method of laying a loaded submarine cable, which includes subjecting consecutive portions of the cable at the latest convenient moment as it leaves the ship to a longitudinal field which in conjunction with the effective existing value of the earth's field has approximately the intensity of and is opposite in direction to the effective value of the earth's field which is expected to influence the laid cable, superimposing upon said longitudinal field an alternating field, and gradually reducing the intensity of said fields, effective upon each consecutive portion, to zero.

4. The method of counteracting the effect of the earth's magnetic field upon a loaded signaling conductor which comprises applying to said conductor a unidirectional field the intensity of and being in a direction opposite to the earth's magnetic field striking said conductor when in use, and simultaneously applying an alternating current field sufficient to saturate the loading of said conductor, and gradually reducing said fields to zero.

5. The method of preventing the loss of inductance of a submarine signaling cable in progress of being laid, which comprises imposing upon said cable a unidirectional field of such magnitude as to be equal and opposite to the longitudinal component of the earth field effective upon the cable after laying, simultaneously superimposing an alternating field sufficient to saturate the loading of said cable, and gradually reducing said alternating field to zero, while maintaining said unidirectional field substantially unchanged.

In witness whereof, I hereunto subscribe my name this 22d day of September, A. D. 1927.

JESSE F. WENTZ.